(12) United States Patent
Hwang et al.

(10) Patent No.: US 7,331,516 B2
(45) Date of Patent: Feb. 19, 2008

(54) PORTABLE TERMINAL HAVING MOVABLE KEYPAD

(75) Inventors: Chang-Hwan Hwang, Goyang-si (KR); Young S. Kim, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 8 days.

(21) Appl. No.: 11/120,253

(22) Filed: May 2, 2005

(65) Prior Publication Data
US 2005/0274786 A1    Dec. 15, 2005

(30) Foreign Application Priority Data
Jun. 10, 2004    (KR) ............... 10-2004-0042449

(51) Int. Cl.
*G06K 5/00*    (2006.01)
(52) U.S. Cl. ............... 235/380; 235/145 R; 455/575.4; 455/566
(58) Field of Classification Search ............... 235/380, 235/472.1, 486; 455/575.4, 566, 575.1; 345/173, 345/156
See application file for complete search history.

(56) References Cited

U.S. PATENT DOCUMENTS

| | | | |
|---|---|---|---|
| 6,009,338 A * | 12/1999 | Iwata et al. ............... 455/575.4 |
| 6,038,313 A * | 3/2000 | Collins ............... 379/433.07 |
| 6,397,078 B1 * | 5/2002 | Kim ............... 455/556.2 |
| 6,480,159 B1 * | 11/2002 | Hsu ............... 343/702 |
| 6,748,249 B1 * | 6/2004 | Eromaki et al. ............... 455/575.4 |
| 6,907,262 B1 * | 6/2005 | Heaysman ............... 455/550.1 |
| 6,950,316 B2 * | 9/2005 | Pan et al. ............... 361/814 |
| 6,961,593 B1 * | 11/2005 | Lonka et al. ............... 455/573 |
| 6,968,161 B2 * | 11/2005 | Inomata et al. ............... 455/90.3 |
| 2003/0112225 A1 * | 6/2003 | Granberg ............... 345/173 |
| 2005/0083642 A1 * | 4/2005 | Senpuku et al. ............... 361/681 |

FOREIGN PATENT DOCUMENTS

WO    WO 03/030497    *    4/2003

* cited by examiner

*Primary Examiner*—Thien M. Le
*Assistant Examiner*—Edwyn Labaze
(74) *Attorney, Agent, or Firm*—The Farrell Law Firm, PC

(57) ABSTRACT

A portable terminal includes a main housing having a display device and a second keypad positioned adjacently to the display device and a first keypad adapted to slide on the main housing to expose and hide at least a part of the display device. The first keypad overlaps the second keypad when the display device is exposed. The portable terminal having a movable keypad can expose a part of the movable keypad, which is adapted to slide, and to position it in such a manner that it overlaps another keypad when not used to provide a large screen. In addition, the movable keypad does not independently occupy a space on the terminal but can selectively overlap another keypad or the display device for making the terminal in a compact size.

9 Claims, 5 Drawing Sheets

PORTABLE TERMINAL HAVING MOVABLE KEYPAD

PRIORITY

This application claims priority to an application entitled "Portable Terminal Having Movable Keypad" filed with the Korean Intellectual Property Office on Jun. 10, 2004 and assigned Serial No. 2004-42449, the contents of which are incorporated herein by reference.

BACKGROUND OF THE INVENTION

1. Field of the Invention

The present invention generally relates to a portable terminal, and more particularly to a portable terminal having a movable keypad for making the terminal in a compact size.

2. Description of the Related Art

In general, "portable terminals" are electronic devices for providing wireless communication between users or between a user and a service provider via telecommunication base stations.

Portable terminals may be classified into bar-type terminals, flip-type terminals, and folder-type terminals based on their appearance. Sliding-type and swing-type terminals have recently appeared to meet diversified tastes and demands of users.

Portable terminals have an input device to input or transmit information and an output device for outputting inputted or received information. The input devices of portable terminals include a microphone for inputting a user's voice, a keypad for inputting character information, and a camera lens for inputting video information. The output devices include a speaker for outputting the partner's voice and sound and a display device for outputting character information and video information.

However, there is a limitation in reducing the area occupied by input and output devices, particularly a keypad and a display device, on a portable terminal when considering the ease of operation and the size of the display screen for displaying information. Therefore, it is difficult to make the terminal in a compact size. Furthermore, a display device for providing a larger screen according to the commercialization of a multimedia servicemakes it even more difficult to make the terminal in a compact size together with the keypad and degrades the portability of the terminal.

SUMMARY OF THE INVENTION

Accordingly, the present invention has been made to solve the above-mentioned problems occurring in the prior art, and an object of the present invention is to provide a portable terminal having a movable keypad for making the terminal in a compact size.

In order to accomplish this object, there is provided a portable terminal including a main housing having a display device and a second keypad positioned adjacently to the display device and a first keypad adapted to slide on the main housing to expose and hide at least a part of the display device, the first keypad overlapping the second keypad when the display device is exposed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein will be omitted when it may make the subject matter of the present invention unclear.

As shown in FIGS. 1 to 5, a portable terminal 100 having a movable keypad 121 according to a preferred embodiment of the present invention includes a main housing 101, a keypad bracket 102 adapted to slide on the main housing 101, and a first keypad 121 positioned on the keypad bracket 102.

Figure 4:
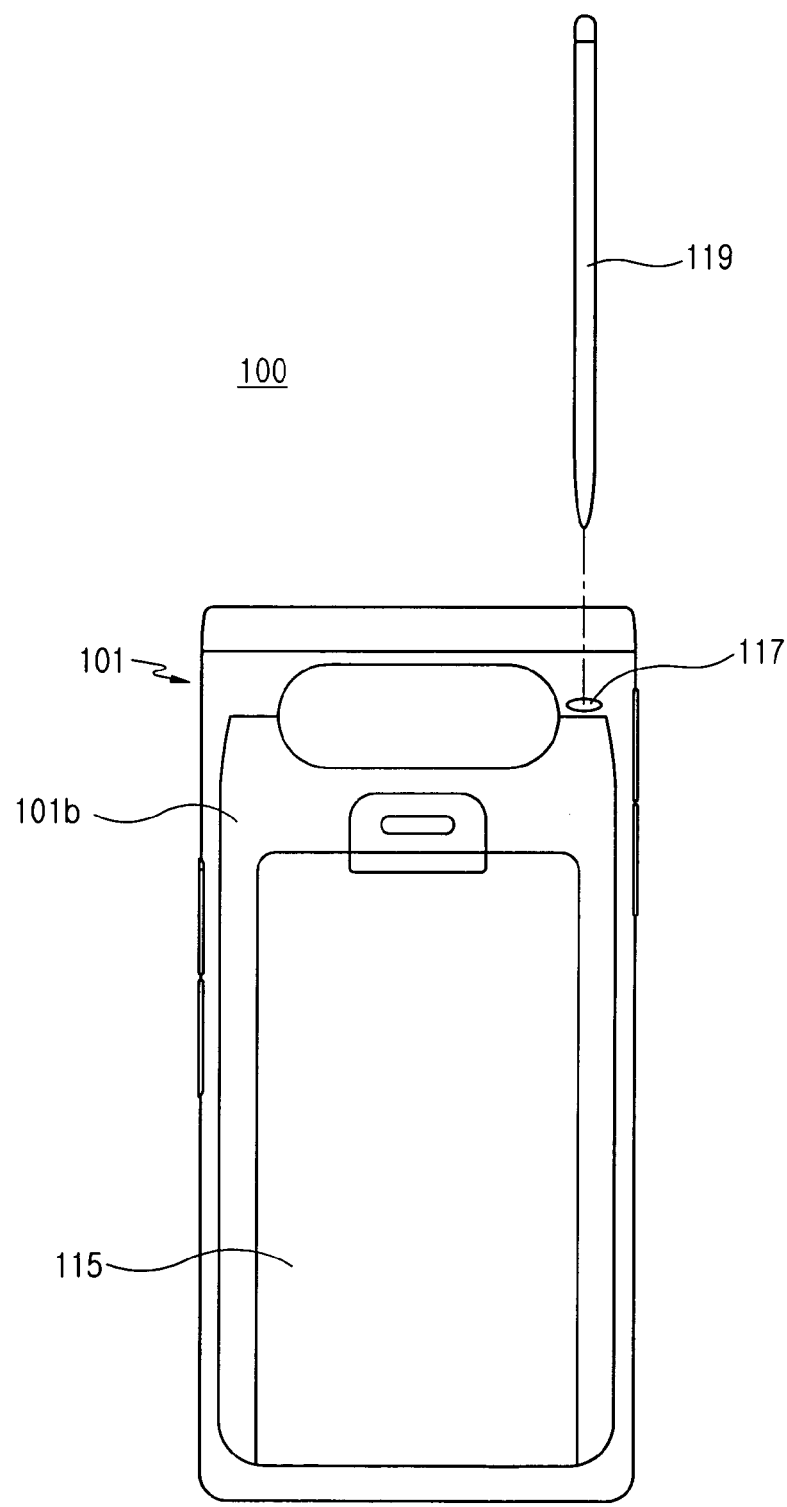
FIG. 4 is a rear view of the portable terminal shown in FIG. 1.

The main housing 101 has a display device 111 positioned on the front surface 101a thereof, a receiver unit 113 positioned next to a side of the display device 111 while containing a speaker therein, and a bracket reception unit 103 positioned next to the other side of the display device 111. The bracket reception unit 103 has a reception space 139 (shown in FIG. 5) formed in the lower portion thereof disposed adjacent to the display device 111. The bracket reception unit 103 is provided with, on the front surface 103a thereof, a second keypad 131 having at least two keys, preferably in form of an array of function keys, and a transmitter unit 133 containing a microphone therein. Preferably, the second keypad 131 is positioned on an outer peripheral surface of the bracket reception unit 103. Referring to FIG. 4, the main housing 101 may be provided with, on the rear surface 101b thereof, a battery pack 115 and a reception hole 117 to receive a stylus pen 119. The reception hole 117 extends along the longitudinal direction from a position adjacent to the upper end of the rear surface 101b of the main housing 101. The display device 111 may be made up of a touch screen.

The keypad bracket 102 is coupled in such a manner that it can slide on the main housing 101. The keypad bracket 102 has the first keypad 121 made up of a number of keys 121a positioned in a 3 by 4 array on the top surface thereof. As the keypad bracket 102 slides on the main housing 101 in one direction, the first keypad 121 is hidden in the reception space 139 of the bracket reception unit 103 or is exposed on the main housing 101 when the keypad bracket 102 slides in the other direction. The keypad bracket 102 slides between the display device 111 and the second keypad 131 while being it a parallel plane to them.

Figure 1:
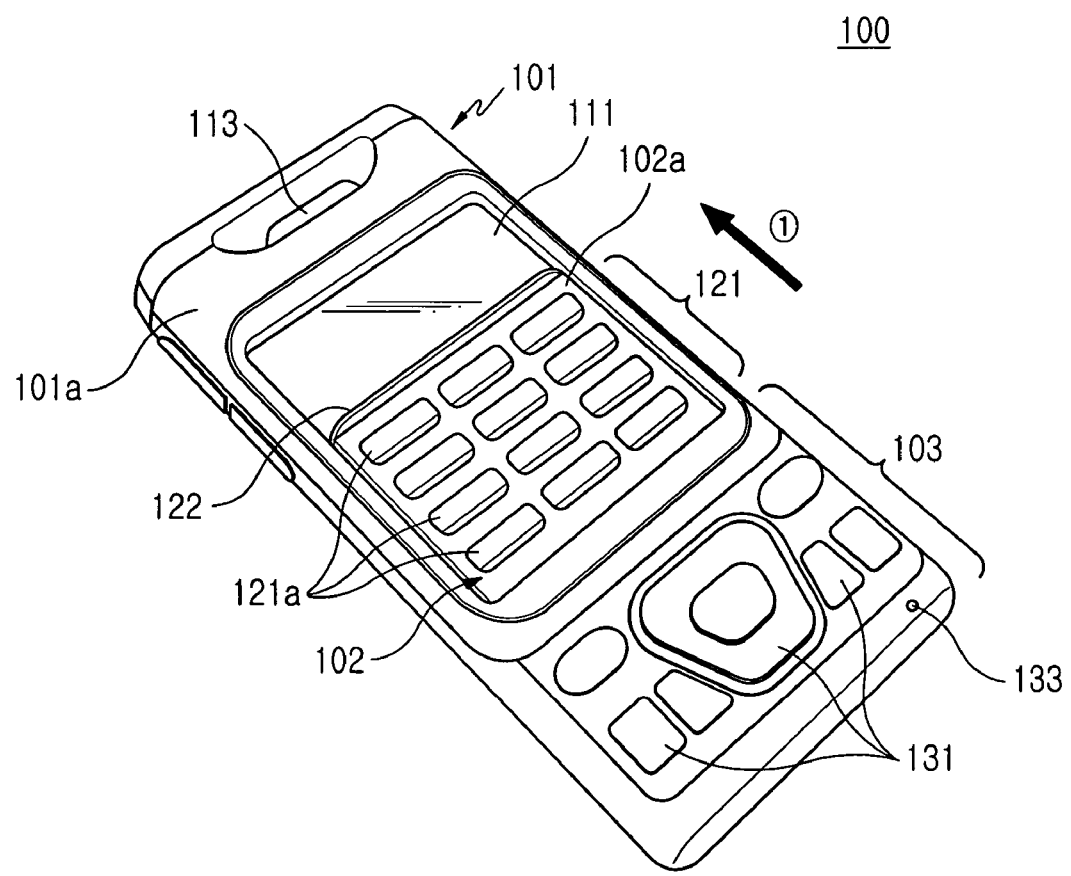
FIG. 1 is a perspective view showing a portable terminal having a movable keypad according to a preferred embodiment of the present invention, in which the movable keypad is exposed.

When the keypad bracket 102 slides along arrow ① as shown in FIG. 1, the display device 111 is partially hidden by the keypad bracket 102. The user then can use the first keypad 121 to input character information or a desired telephone number to make a call. The display device 111 is protected by the keypad bracket 102 while in the standby mode.

Figure 2:
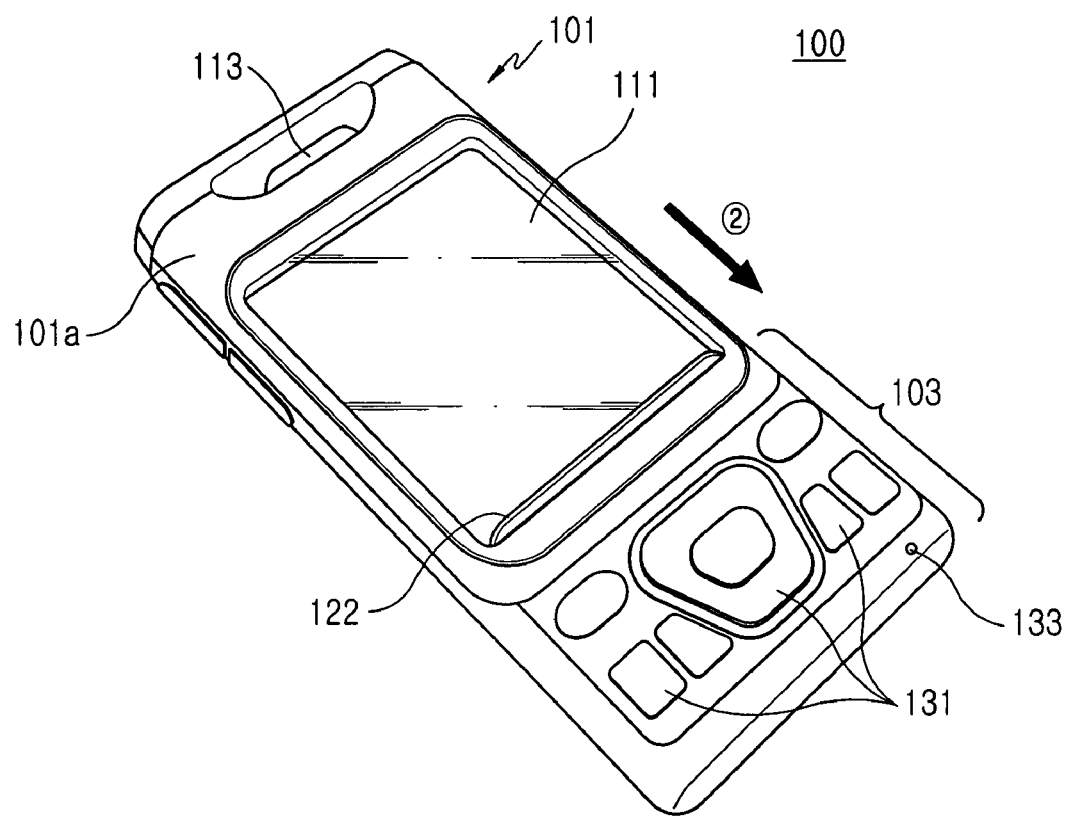
FIG. 2 is a perspective view of the portable terminal shown in FIG. 1, in which the movable keypad is hidden.
Figure 3:
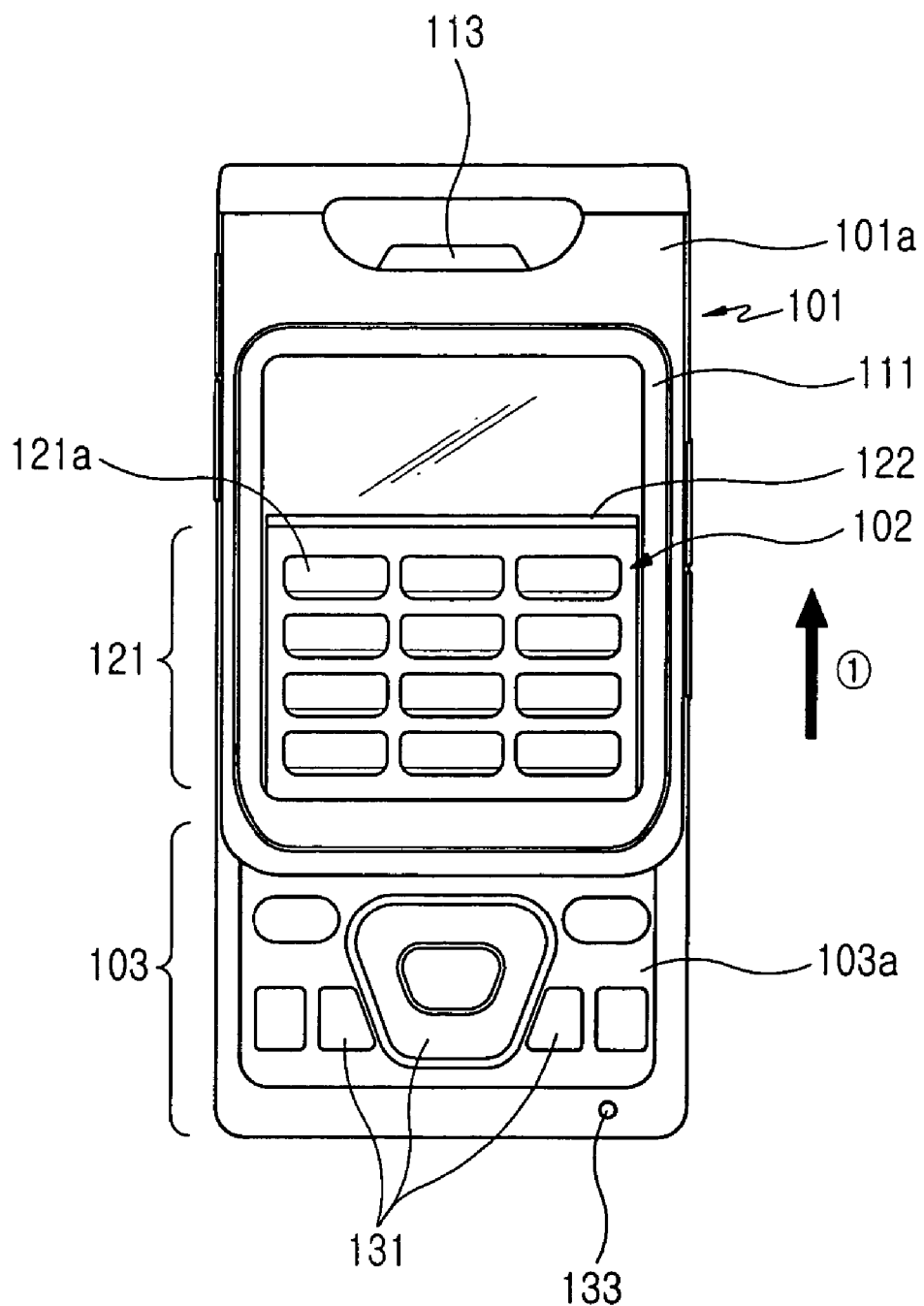
FIG. 3 is a front view of the portable terminal shown in FIG. 1.

When the keypad bracket 102 slides along arrow ②  and is positioned in the reception space 139 of the bracket reception unit 103 as shown in FIG. 2, the display device 111 is completely exposed and provides a large screen. The user then can receive a call or use the second keypad 131 to perform menu selection/movement, perform information searches, and so on.

The user also can use the stylus pen 119 to directly input data or perform an information search through the display device 111.

The keypad bracket 102 has a handle 122 partially protruding from the upper end thereof so that the user can conveniently grasp the handle 122 to slide the keypad bracket 102, and is provided with guide ribs 129 formed on both lateral ends thereof, respectively, to guide the sliding movement of the keypad bracket 102.

Figure 5:
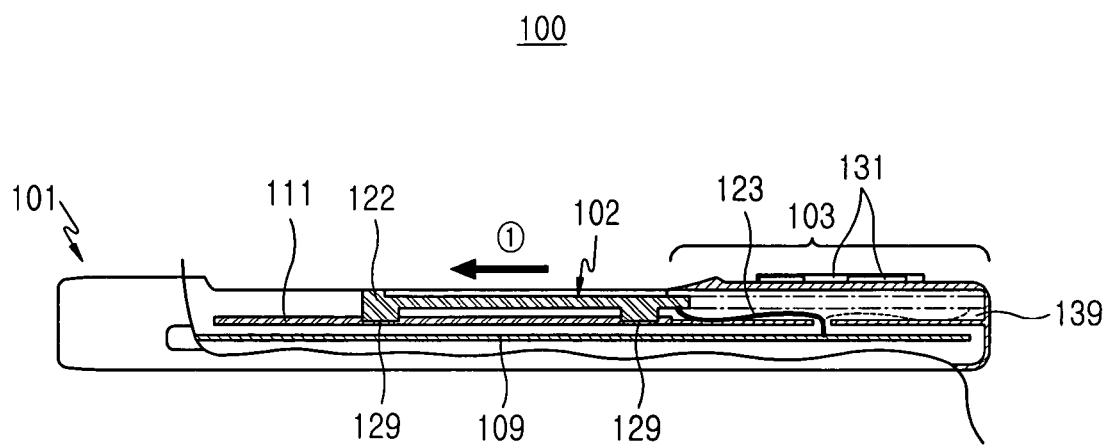
FIG. 5 is a partially-broken lateral sectional view of the portable terminal shown in FIG. 1.

Referring to FIG. 5, a flexible print circuit 123 extends from the keypad bracket 102 and is connected to a main board 109 within the main housing 101 to transmit input signals generated from the first keypad 121 to the main board 109. It is obvious that the flexible printed circuit 123 must have a sufficient length considering the range of sliding of the keypad bracket 102.

As mentioned above, the portable terminal having a movable keypad according to the present invention can expose a part of the movable keypad, which is adapted to slide, and to position it in such a manner that it overlaps another keypad when not in use, to provide a large screen. The movable keypad does not independently occupy a space on the terminal but can selectively overlap another keypad or a display device, which is advantageous in making the terminal in a compact size.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal comprising:
   a main housing having a display device and a second keypad positioned adjacent to the display device; and
   a first keypad adapted to slide with respect to the main housing to expose and hide at least a part of the display device, the first keypad overlapping the second keypad when the display device is completely exposed.

2. The portable terminal as claimed in claim 1, wherein the first keypad is made up of keys in 3 by 4 array.

3. The portable terminal as claimed in claim 1, further comprising a keypad bracket adapted to slide in a plane parallel to the display device and the second keypad, the first keypad being positioned on a surface of the keypad bracket.

4. The portable terminal as claimed in claim 3, further comprising a bracket reception unit positioned adjacent to an end of the display device to selectively receive the keypad bracket as the bracket slides.

5. The portable terminal as claimed in claim 4, wherein the second keypad has at least two keys and is positioned on the outer peripheral surface of the bracket reception unit.

6. The portable terminal as claimed in claim 3, further comprising a flexible printed circuit extending from the keypad bracket into the main housing.

7. The portable terminal as claimed in claim 1, further comprising a receiver unit positioned next to a side of the display device containing a speaker therein.

8. The portable terminal as claimed in claim 1, wherein the main housing has a reception hole formed on the rear surface thereof extending along the longitudinal direction of the main housing to receive a stylus pen.

9. The portable terminal as claimed in claim 1, wherein the first keypad is adapted to be completely hidden when overlapping the second keypad and to hide at least a part of the display device when completely exposed.

* * * * *